United States Patent
Schüler et al.

(10) Patent No.: US 12,466,712 B2
(45) Date of Patent: Nov. 11, 2025

(54) AUTONOMOUSLY-GUIDED INDUSTRIAL TRUCK HAVING THREE STRUCTURAL LEVELS

(71) Applicant: Jungheinrich Aktiengesellschaft, Hamburg (DE)

(72) Inventors: Michael Schüler, Wakendorf (DE); Helmut Lohmann, Gyhum (DE); Holger Brunckhorst, Norderstedt (DE); Marcel Krenzin, Bad Bramstedt (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 428 days.

(21) Appl. No.: 17/819,374

(22) Filed: Aug. 12, 2022

(65) Prior Publication Data

US 2023/0047245 A1  Feb. 16, 2023

(51) Int. Cl.
*B66F 9/06* (2006.01)
*B66F 9/075* (2006.01)
*B66F 17/00* (2006.01)

(52) U.S. Cl.
CPC ............ *B66F 9/063* (2013.01); *B66F 9/0755* (2013.01); *B66F 17/003* (2013.01)

(58) Field of Classification Search
None
See application file for complete search history.

(56) References Cited

U.S. PATENT DOCUMENTS

2009/0152052 A1* 6/2009 Schoettke ............ B66F 17/003
                                                                  187/223
2024/0067510 A1* 2/2024 Ulbrich ................... B66F 9/063

FOREIGN PATENT DOCUMENTS

| CN | 103482535 A | 1/2014 |
|---|---|---|
| CN | 108814452 * | 11/2018 |
| CN | 209668702 U | 11/2019 |
| DE | 202013011144 U1 | 2/2014 |
| DE | 212014000129 U1 | 2/2016 |
| DE | 202020103181 U1 | 7/2020 |
| EP | 3815852 A1 | 5/2021 |

(Continued)

OTHER PUBLICATIONS

European Application No. 22188526.2, Extended European Search Report mailed Jan. 19, 2023, 7 pages.

(Continued)

*Primary Examiner* — Hongye Liang
(74) *Attorney, Agent, or Firm* — Kilpatrick Townsend & Stockton LLP

(57) ABSTRACT

An autonomously-guided industrial truck comprising a vehicle frame defining, in a plan view, a vehicle contour in sections. The vehicle frame comprises three structural levels, arranged one above the other in a vertical direction, each with its own contour. The three structural levels include a lower structural level in which a base structure is attached, an upper structural level with a covering, and a middle structural level comprising a frame structure for connecting the lower structural level and the upper structural level. The industrial truck includes at least one drive wheel assigned to the vehicle frame to stand below the vehicle frame on a driving surface and at least one scanner unit arranged completely within the vehicle contour such that a scanning plane of the at least one scanner unit lies at least in sections vertically in a region of the middle structural level.

23 Claims, 3 Drawing Sheets

(56) References Cited

FOREIGN PATENT DOCUMENTS

Figure 1A:
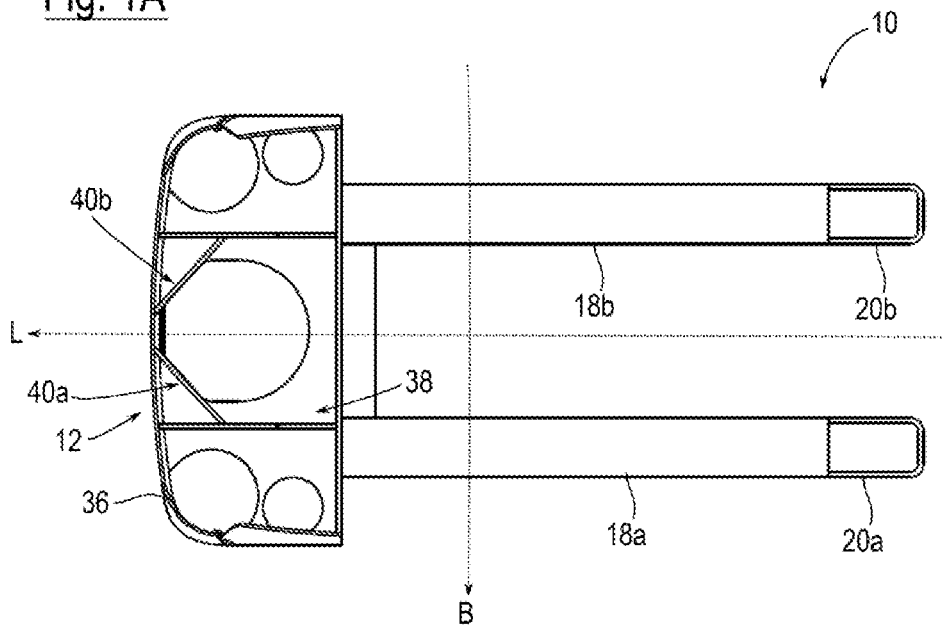

| | | |
|---|---|---|
| WO | 2019089923 A1 | 5/2019 |
| WO | 2020187457 A1 | 9/2020 |
| WO | 2021069674 A1 | 4/2021 |

OTHER PUBLICATIONS

German Application No. DE102021121218.9, "Search Report", Jun. 29, 2022, 5 pages.

* cited by examiner

AUTONOMOUSLY-GUIDED INDUSTRIAL TRUCK HAVING THREE STRUCTURAL LEVELS

CROSS REFERENCE TO RELATED APPLICATION

This application claims priority to German Patent Application No. 10 2021 121 218.9, filed in Germany on Aug. 16, 2021, the entire contents of which are hereby incorporated herein by reference.

The present invention relates to an autonomously-guided industrial truck comprising a vehicle frame, which, in a plan view of the industrial truck, defines a vehicle contour in sections, and at least one drive wheel which is assigned to the vehicle frame in order to stand below it on a driving surface.

It is known that, in autonomously-guided industrial trucks of this type, scanner units are to be provided which can be used, on the one hand, as personal protection scanners and, on the other, as navigation scanners. Such scanner units have to cover the largest possible angle range around the industrial truck to ensure both the safety of persons in the vicinity of the truck and the navigation capability of the industrial truck.

For this purpose, in such autonomously-guided industrial trucks known so far, the scanner units are usually located outside the frame geometry or vehicle contour in the region of the vehicle frame, since components installed on the vehicle frame of the corresponding industrial truck, such as, for example, support rollers and the like, which are to be arranged as far outwards as possible in the width direction of the vehicle, could otherwise limit the visual range of the corresponding scanner units and could impair the necessary panoramic view. Furthermore, the scanner units are frequently arranged relatively high in already known, autonomously-guided industrial trucks, since functional components, such as, for example, the already mentioned support wheels, are arranged in lower areas of the corresponding vehicles, which components, for the reasons mentioned, could also impair the function of the scanner units.

The above-described configuration of previously known, autonomously-guided industrial trucks shows that they are less flexible both with regard to their vehicle width, due to the scanner units arranged outside the frame geometry, and with regard to the vertical positioning of the scanner plane of their scanner units, and are therefore not suitable for all conceivable applications. In particular, for the reasons mentioned above, it seems very difficult to make autonomously-guided industrial trucks having said previously known configuration usable in logistics facilities with block storage, where commercially available pallets are stored next to one another on the driving surface. This type of pallet storing requires, on the one hand, industrial trucks that are narrower than the pallets themselves in order to be able to move freely between them, i.e., for example, narrower than approximately 800 mm in the case of Euro pallets, and, on the other hand, particularly low positioning of their horizontally-aligned scanning plane in order to be able to detect even empty pallets standing on the floor, which would be made impossible if the scanner units were arranged at a higher position and which could thus represent a safety risk.

For similar reasons, industrial trucks are also known from the prior art which have three or four driven wheels are also only insufficiently suitable for this application, since such driven wheels generally also have an increased overall height and thus do not allow for the use of scanner units at the above-described desired positions within the vehicle contour in the region of the vehicle frame and at a vertically low height.

Accordingly, it is the aim of the present invention to further develop an autonomously-guided industrial truck of the generic type described above in such a way as to eliminate the aforementioned disadvantages of industrial trucks known from the prior art and to create, with a reduced vehicle width and a vertical height of a scanning plane above the driving surface that is substantially selectable at will, the possibility of nevertheless achieving comparable performance with respect to spatial angle coverage of the scanner units and the other mechanical and operational performance parameters of the industrial truck.

According to the invention, an autonomously-guided industrial truck of the above-described type is accordingly proposed, in which the vehicle frame comprises three structural levels, arranged one above the other in the vertical direction, with different contours, viz., a lower structural level in which a base structure is arranged, an upper structural level with a covering, and a middle structural level which comprises a frame structure for connecting the lower structural level and the upper structural level.

It is understood here that the contours of the three mentioned structural levels refer to horizontal cross-sections thereof. The width direction and the longitudinal direction of the industrial truck are used herein in the nomenclature usually used in such a way that the longitudinal direction corresponds to a straight-ahead driving direction of the industrial truck, wherein any existing fork prongs of a load unit extend counter to the longitudinal direction, and the width direction is horizontally perpendicular to the longitudinal direction. Furthermore, the industrial truck according to the invention further comprises at least one such scanner unit, and preferably a pair of scanner units opposite one another in the width direction, which is arranged completely within the contour of the vehicle frame in such a way that its scanning plane lies at least in sections vertically in the region of the middle structural level. In this case, the scanning plane spanned by the at least one scanner unit can be aligned substantially horizontally or slightly obliquely downwards in order to be able to achieve an optimal detection of obstacles and path marks in the surroundings of the industrial truck.

In preferred embodiments of the present invention, the lower structural level and the upper structural level can have substantially the same contour at least in sections, which, among other things, offers the advantage that in this way, in the corresponding regions, the middle structural level is surrounded both from above and from below by vehicle frame parts projecting in the same way in the width direction and/or longitudinal direction, which in turn makes it difficult for objects located in the surroundings of the industrial truck to penetrate the region of the middle structural level, which thus protects the components located there, e.g., the already mentioned scanner units, from being damaged. Furthermore, this structural measure creates a uniform silhouette of the industrial truck in a side and front view, which, in addition to the above-mentioned function of protection against damage, is also perceived as being pleasant to the eye.

Although, in certain embodiments, the industrial truck according to the invention could also be designed, for example, as a three-wheeler comprising only a single, controlled drive wheel in the central region of the vehicle frame and two load wheels arranged at a distance therefrom, e.g., in the region of load arms, in other embodiments, the industrial truck according to the invention can also be designed as a four- or five-wheeler and can further comprise a pair of support rollers or drive rollers, arranged opposite one another in the width direction, which are assigned to the vehicle frame and are accommodated completely within the lower structural level in relation to the vertical direction. In this way, by providing such support or drive rollers that are designed to be particularly flat and therefore do not extend from below and beyond the lower structural level, it can be ensured that the middle structural level at the position of these support or drive rollers is free of components which could negatively influence the visual range or the function of the already mentioned scanner units.

While, in four-wheel embodiments of an industrial truck according to the invention, only one pair of rollers located opposite one another in the width direction is used in the region of the vehicle frame, in a five-wheel embodiment, the support or drive rollers can be designed purely as support rollers, and a single controlled drive wheel can furthermore be provided which is assigned centrally to the vehicle frame in relation to the width direction of the industrial truck in order to stand below it on a driving surface, wherein the base structure has an opening for receiving the individual central drive wheel.

In particular, the support rollers could be designed as part of support roller arrangements with a housing, which housing, in sections, defines the contour of the lower structural level. In such a case, corresponding recesses would have to be provided in the base plate in the region of its contour, in which recesses the support roller arrangements are mounted, in order to define part of the contour of the base plate arrangement thus formed. In this way, a maximum distance of the two support roller arrangements with respect to the width direction of the industrial truck according to the invention can be achieved, which results in an increased stability of the vehicle with respect to forces acting in the width direction when larger loads are carried and during fast cornering.

While, in the lower structural level, the base structure could be formed, for example, by an assembly formed from several welded frame parts or screwed components, it is also possible to imagine embodiments in which the base structure comprises or is formed by a base plate, which can be formed in one piece and and/or which, in the case of five-wheel embodiments of the vehicle, if necessary has an opening for receiving the individual central drive wheel.

Where even greater forces acting in the width direction are to be expected in certain embodiments of the vehicle according to the invention, e.g., in high-lift industrial trucks, the corresponding support rollers or support roller arrangements can also project beyond other parts of the vehicle contour in this region, which, however, can in turn lead to an increased width of the vehicle and could render the vehicle unsuitable for certain applications, such as the already mentioned logistics facilities with block storage.

As already mentioned, the industrial truck according to the invention can also comprise two wheel arms, each of which is associated with at least one load wheel and which, in the region of the lower structural level, are firmly connected to the vehicle frame and extend backwards from this along a longitudinal direction of the industrial truck. Since in this way the wheel arms are likewise completely assigned to the lower structural level, they also do not present an obstacle to the scanner units mentioned, and thus also do not create any angle ranges that cannot be covered by the scanner units.

Furthermore, the at least one scanner unit can have a design-related scanning angle of approximately 270° and/or a scanning field width in the vertical direction of approximately 50 mm. Such scanner units are readily available on the market and typically use laser techniques for personal protection and for navigating the industrial trucks equipped therewith. It is understood that the term, "plane," is not to be interpreted strictly geometrically, but that the scanning plane concerned, rather, has a finite extension in the vertical direction.

The design of the contour of the middle structural level already described above makes it possible to arrange the pair of scanner units in such a way that they can completely cover the scanning plane in a range of 360° around the vehicle. In this case, however, there may be a narrow, triangular dead zone not monitored by the scanner units, e.g., in front of the vehicle, the extent of which dead zone is defined by the exact configuration of the tapered shape of the frame structure at the front end of the industrial truck. However, apart from this extremely small dead zone which may occur under certain circumstances, the two scanner units can fully monitor the entire surroundings of the industrial truck according to the invention, wherein, moreover, redundant sections or angle ranges in front of and behind the vehicle are conceivable which are covered by both scanner units.

In this case, the exact position of the at least one scanner unit with respect to the longitudinal or width direction of the industrial truck according to the invention can be freely selected to a certain degree, but it may be advantageous if it is arranged behind the support or drive rollers in the longitudinal direction of the industrial truck. In this way, it can be ensured in particular that an optimal coverage by the corresponding scanner unit is achieved in the rear region around the industrial truck, although embodiments are also conceivable in which the at least one scanner unit is arranged in the longitudinal direction of the industrial truck in front of or above the support rollers.

Furthermore, the industrial truck according to the invention can comprise a load unit, guided in a vertically-displaceable manner on the vehicle frame, for bearing a load, and preferably lifting profiles for guiding the load unit, which extend in the vertical direction only in the region of the upper structural level. Since, in this way, the lifting profiles also do not protrude into the region of the middle structural level, they too cannot present an obstacle to the scanner unit and consequently cannot create any dead zones in the scanning plane or other disadvantageous effects. As an alternative to a load unit, however, the industrial truck according to the invention could also be designed as a tow tractor and could then comprise, for example, a coupling or an interface for load-bearing means.

In a similar manner, the load unit of the industrial truck according to the invention can have two prongs and a load stop, connecting the fork prongs, or a monofork with a load stop, wherein the load stop can have two recesses which are opposite one another in the width direction and which, in a maximally-lowered state of the load unit, are aligned with the middle structural level. A monofork usually refers to a load-bearing device in which two sections which extend horizontally from the load stop are connected by a connecting section so as to prevent the lifting of a conventional pallet while allowing grid trolleys, rolling containers, and similar objects to be safely transported.

The measure just described creates vision panels in the region of the middle structural level, which also contribute to creating as large an angle range as possible for monitoring by the scanner units and to ensuring, for example, that the fork prongs can be partially scanned in their maximally-lowered state, i.e., that the effective scanning plane extends beyond the fork prongs.

The structural measure of providing recesses on the load stop of the load unit can require that the fastening of the fork prongs or of the extending sections of the monofork to the load stop take place only at central positions, since, as a result of providing such recesses, corresponding fastening points can no longer be present in the outer regions. In such embodiments, the necessary stiffness of the load unit can be achieved, for example, in that a strut of the fork prongs lying further inwards in the width direction is designed to be reinforced and in this way absorbs a majority of the forces acting as a result of a load to be borne.

With regard to the frame structure of the middle structural level, it is conceivable to design the latter in such a way that it lies completely within and at a distance from the contour of the vehicle frame with respect to the width direction and/or surrounds the opening of the base plate and/or has a tapered shape in a front section with respect to the longitudinal direction and/or delimits, at least in sections, a scanning region of at least one of the scanner units.

By taking these measures either individually or in any combination thereof when designing the middle structural level, it is possible to—when arranging the pair of scanner units in a corresponding manner—achieve a panoramic view in an angle range around the entire vehicle, free of dead zones not covered by the scanner units.

Furthermore, the frame structure for connecting the lower structural level and the upper structural level can comprise at least two connecting struts extending substantially in the longitudinal direction, which extend between a front and a rear section of the vehicle frame and, in sections, in both the middle and the upper structural levels, but, in the longitudinal region of the tapered shape of the frame structure, only in the upper structural level. These connecting struts ensure that sufficient reinforcement of the connection between the lower and upper structural levels and the components contained therein—in particular, the base plate and the covering—can be ensured, since they ensure that a frictional connection between the lower and the upper structural levels can take place in a suitable manner.

In this case, two of these connecting struts can delimit the frame structure in sections to the outside in the width direction, and thus form side walls of this frame structure.

As already discussed above in the specific application for logistics facilities with block storage, the industrial truck according to the invention can have an extension of approximately 800 mm or less in the width direction in order to be smaller than the outer dimensions of Euro pallets.

Alternatively or additionally, for an optimal vertical placement, the scanning plane, relative to such pallets, can extend in the vertical direction, and the lower structural level can extend up to a height of approximately 75 mm above the vehicle base, the middle structural level can extend from a height of approximately 75 mm to a height of approximately 125 mm, and the upper structural level can extend upwards from a height of approximately 125 mm. Thus, the scanning plane can be at a mean height of approximately 100 mm relative to a driving surface, and its width of +/−25 mm can be completely covered by the middle structural level in the vertical direction.

Figure 1B:
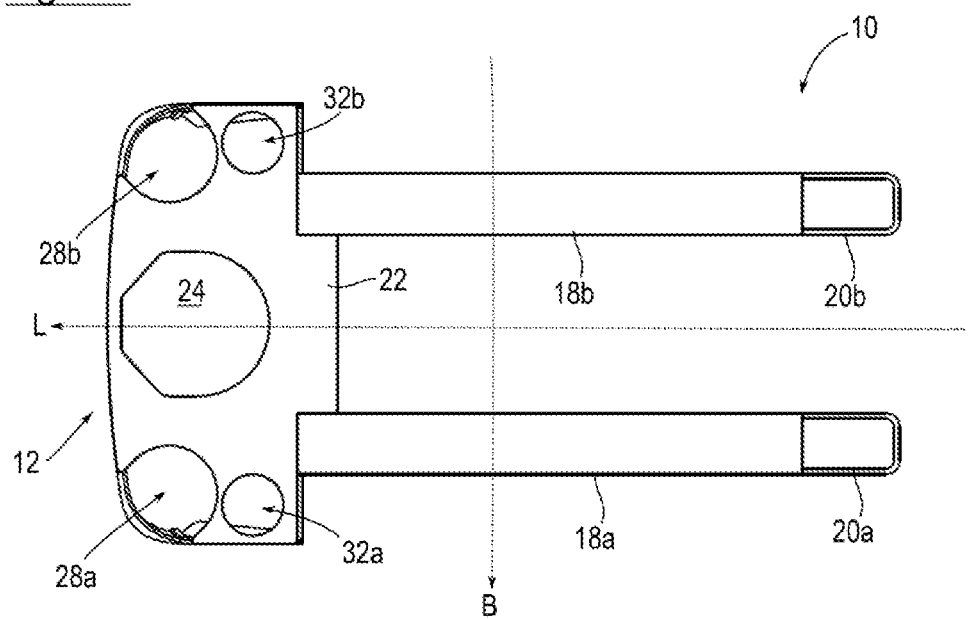
Figure 2:
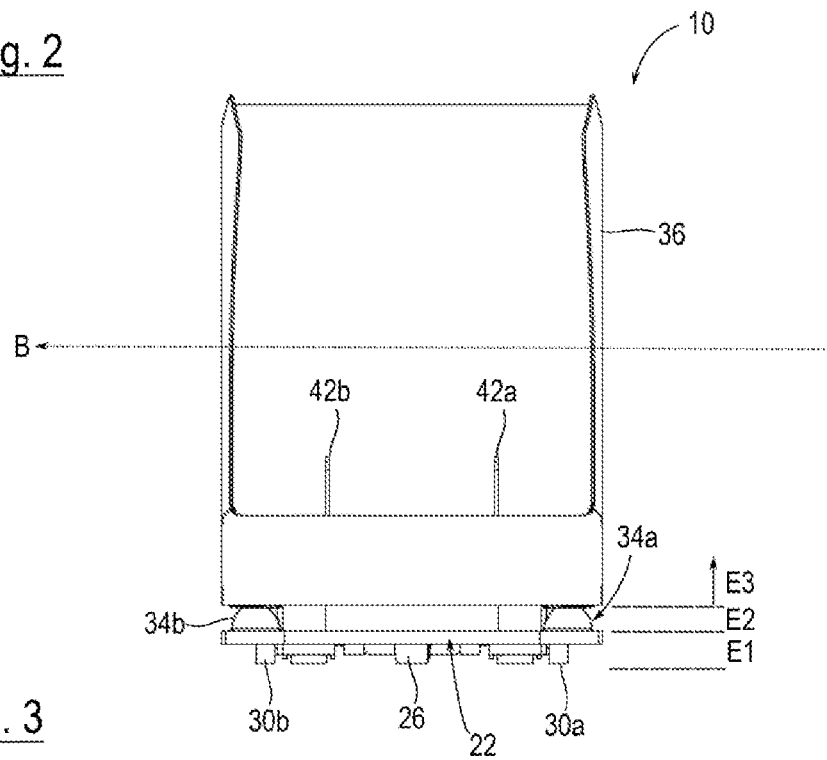
Figure 3:
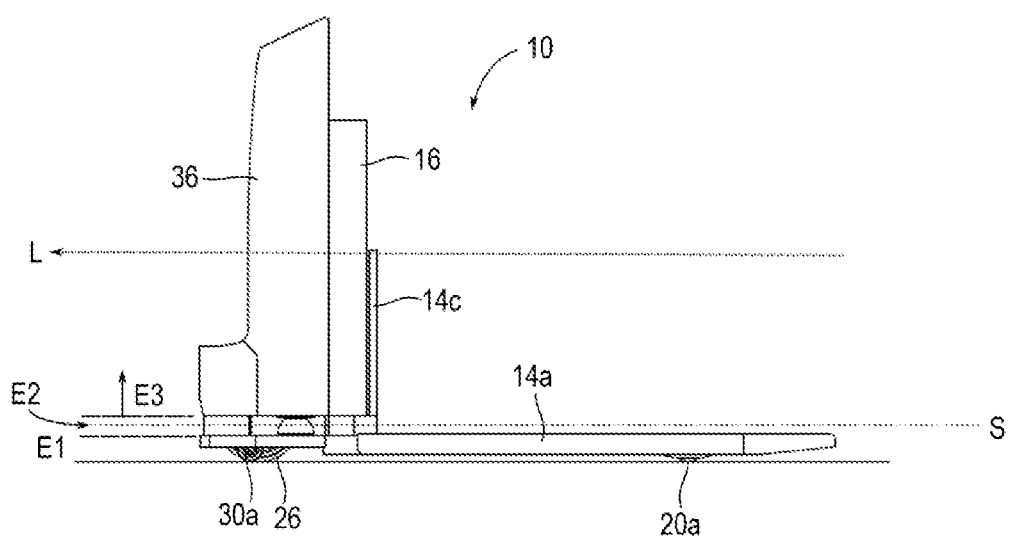
Figure 4A:
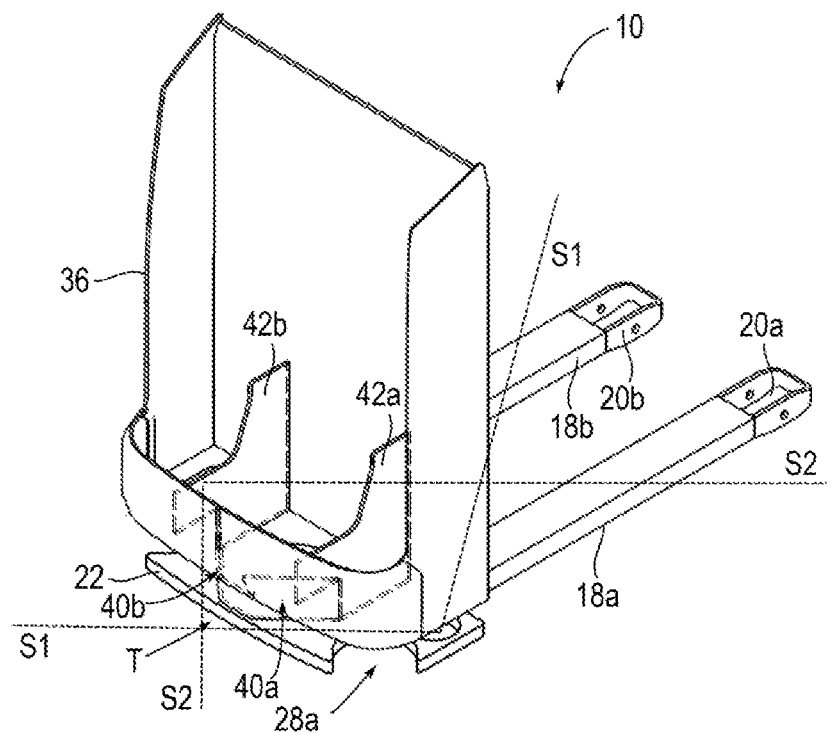
Figure 4B:
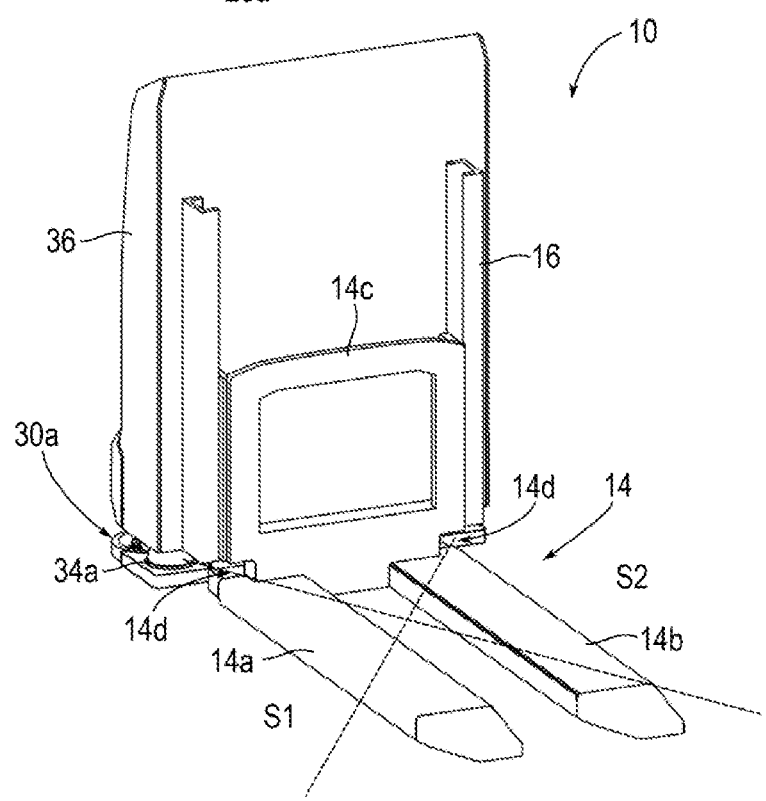

Further features and advantages of the present invention will become even more apparent from the following description of an embodiment, when viewed together with the accompanying figures. In detail, the following are shown in a schematic representation in each case:

FIGS. 1A and 1B an autonomously-guided industrial truck according to the invention viewed from above and below;

FIG. 2 the industrial truck according to the invention in a front view;

FIG. 3 the industrial truck according to the invention viewed from the side; and FIGS. 4A and 4B isometric views of the industrial truck according to the invention obliquely from the front and obliquely from the rear.

FIGS. 1A through 4B show an embodiment of an autonomously-guided industrial truck according to the invention schematically in different views, with some of the components of the industrial truck being omitted in some of the figures for reasons of clarity.

The industrial truck shown in the figures is generally denoted by reference number 10 and comprises a vehicle frame 12 and a load unit 14, guided in a vertically-displaceable manner on the vehicle frame 12, with two fork prongs 14a and 14b, as well as a load stop 14c connecting the fork prongs 14a, 14b to accommodate a load, which is guided by means of lifting profiles 16, which will be discussed in more detail further below.

FIGS. 1A and 1B also show that the industrial truck 10 comprises two wheel arms 18a and 18b, which have only schematically illustrated load wheels 20a, 20b in the region of their ends facing away from the vehicle body 12. Furthermore, a longitudinal axis and a width axis L or B are drawn in FIGS. 1A and 1B, which, in the usual manner, depict the corresponding directions in the industrial truck 10 and span a horizontal plane.

In particular, the view from below in FIG. 1B further shows that the vehicle body 12 on its underside has a base plate 22, the contour of which corresponds at least in sections to the contour of the vehicle frame 12 and which has a central opening 24 for receiving a drive wheel 26 that can be seen, for example, in FIG. 3. Furthermore, FIG. 1B shows that the base plate 22 further has, in its front lateral corner regions, two recesses 28a and 28b, in which the support roller arrangements 30a and 30b, which are clearly visible for example in FIG. 4A, can be mounted, which accordingly also form part of the contour of the base plate arrangement and are spaced apart at a maximum from one another with respect to the width direction B in order to ensure a secure standing of the industrial truck 10 even during fast cornering and high cargo load.

In addition, FIGS. 1A and 1B show further recesses 32a and 32b in the base plate 22, which are provided for receiving lower sections of scanner units 34a and 34b, which are clearly visible, for example, in FIGS. 2 and 3, which extend upwards from the further recesses 32a and 32b and beyond the base plate 22.

In contrast, the plan view of FIG. 1A shows a covering 36 and a frame structure 38, which both extend above the base plate 22 and shall be described in more detail below with reference to FIGS. 2 and 3.

These figures show a front view or a side view of the vehicle 10, and it can be clearly seen that the vehicle frame or vehicle body 12 has three structural levels arranged vertically one above the other, viz., a lower structural level E1, which comprises, among other things, the base plate 22 and the support roller arrangements 30a and 30b and, in this vertical range, corresponds to the contour of the vehicle frame in the plan view of FIG. 1A; a middle structural level E2, in which the frame structure 38 and, in sections, the scanner units 34a and 34b are arranged, wherein the frame structure 38 in the width direction B lies completely within and at a distance from the contour of the vehicle frame in the plan view of FIG. 1B, and an upper structural level E3, in which the covering 36 is arranged and which accommodates further components (not shown) of the industrial truck 10, e.g., a battery arrangement, a control unit, a communications unit, electrical and/or hydraulic drive units, and similar functional elements, which are responsible for the operation of the industrial truck 10.

Furthermore, it can be seen that the controlled drive wheel 26 extends over all three structural levels E1 through E3 in the vertical direction and is surrounded in sections by the frame structure 38 in the width direction. The frame structure 38 further converges into a front—in relation to the longitudinal direction L—section with two side walls 40a and 40b standing at an angle to one another.

FIG. 3 also shows how the scanning plane S, which is spanned by the scanner units 34a and 34b and is substantially vertically aligned, lies with respect to its height position, viz., centered on the middle structural level E2, wherein the vertical extension of the middle structural level E2 is supposed to just correspond to the corresponding width of the scanning plane S.

In particular, in the isometric oblique front view in FIG. 4A shown in a partially cut-through manner, it can also be seen that, in addition to the two tapering walls 40a and 40b, the frame structure 38 also comprises two connecting struts 42a and 42b extending substantially in the longitudinal direction L, which, on the one hand, constitute a lateral boundary, i.e., lateral walls, of the frame structure 38 and, for this purpose, extend in sections both in the middle structural level E2 and the upper structural level E3, while, however, in the longitudinal region of the tapering walls 40a and 40b, being present only in the upper structural level E3.

This can ensure, on the one hand, the structural strength of both the connection between the lower structural level E1 and the upper structural level E3 and the distribution of forces from the base plate 22 into the covering 36 or further components arranged in the upper structural level E3, e.g., a sheet metal construction (not shown in the figure), which can carry further elements in the region of the upper structural level E3.

In addition, the fact that the connecting struts 42a and 42b are provided only above the middle structural level E2 in the region of the tapering walls 40a and 40b ensures that they do not present an obstacle to the spreading out of the scanning plane S by the two scanner units 34a and 34b.

The angle overlap of the individual scanning regions S1 and S2 indicated in the figures can be achieved by the two scanner units 34a and 34b due to the fact that these scanner units 34a and 34b are each provided with a design-related scanning angle of 270°. It is obvious that, by providing the frame structure 38 provided centrally in the width direction B and, in addition, the two tapering walls 40a and 40b in the surrounding region lying in front of the vehicle 10 with respect to the longitudinal direction L, there is only a very small triangular dead zone T, whereas, in the rear area of the industrial truck 10, due to the flat design of the wheel arms 18a and 18b and the forks 14a and 14b of the load unit 14, which, in their maximally-lowered state, are also located completely in the region of the lower structural level E1, an overlapping of these forks 14a and 14b is possible in such a way that the scanning plane S runs above it, and the load forks 14a and 14b are thus overscanned.

A further measure which contributes to complete angle coverage of the scanning plane E is the provision of recesses 14d in the load stop 14c of the load unit 14, which are opposite one another in the width direction B, and the arrangement of the lifting profiles 16 only in the region of the upper structural level E3. In this way, in the region of the middle structural level E2, a respective window is created by the recesses 14d, which window allows for a further enlargement of the angle coverage of the respective scanning regions S1 and S2, as can be seen, for example, in FIGS. 4A and 4B, so that they intersect already in the region of the fork prongs 14a and 14b, hence, there is an overlap of the scanning regions S1 and S2 behind the industrial truck 10, which, overall, allows and effects a complete 360° coverage of the scanning plane S.

The invention claimed is:

1. An autonomously-guided industrial truck, comprising:
a vehicle frame for connection to a load unit or load bearing means, the vehicle frame defining a vehicle contour in horizontal cross-sections, the vehicle frame comprising three horizontal structural levels, arranged one above the other in a vertical direction, the three horizontal structural levels comprising:
a lower structural level in which a base plate is arranged, the base plate receiving a lower section of at least two scanner units and receiving a drive wheel of the industrial truck, the lower structural level having a first contour;
an upper structural level with a covering, the upper structural level having a second contour; and
a middle structural level comprising a frame structure for connecting the lower structural level and the upper structural level, wherein the middle structural level includes a region formed between the first contour and the second contour;
at least one drive wheel assigned to the vehicle frame to stand below the vehicle frame on a driving surface; and
wherein the at least two scanner units are arranged within the vehicle contour and in the middle structural level, extending vertically upwards from the base plate such that a scanning plane of the at least two scanner units lie vertically in a region of the middle structural level; and
wherein the at least two scanner units are arranged such that the scanning plane is completely covered in a range of three hundred sixty degrees (360°) along a horizontal direction relative to the industrial truck by the at least two scanner units.

2. The autonomously-guided industrial truck of claim 1, wherein the first contour of the lower structural level and the second contour of the upper structural level are, at least in some of the sections, the same.

3. The autonomously-guided industrial truck of claim 1, further comprising a pair of support rollers or drive rollers opposite each other in a width direction of the autonomously-guided industrial truck, wherein the pair of support rollers or driver rollers are assigned to the vehicle frame and are fully accommodated within the lower structural level in relation to the vertical direction.

4. The autonomously-guided industrial truck of claim 3, wherein the pair of support rollers or drive rollers are designed as support rollers, wherein a single, controlled drive wheel is assigned centrally to the vehicle frame in relation to a width direction of the autonomously-guided industrial truck to stand below the autonomously-guided industrial truck on a driving surface, and wherein the base plate comprises an opening for receiving the single, controlled drive wheel.

5. The autonomously-guided industrial truck of claim 4, wherein the pair of support rollers are part of support roller arrangements with a housing, wherein the housing defines, in at least some of the sections, the first contour of the lower structural level.

6. The autonomously-guided industrial truck of claim 3, wherein the at least two scanner units are arranged behind the pair of support rollers or drive rollers in a longitudinal direction of the industrial truck.

7. The autonomously-guided industrial truck of claim 1, wherein the base structure comprises or is formed by a base plate.

8. The autonomously-guided industrial truck of claim 1, further comprising two wheel arms, each of the two wheel arms being associated with at least one load wheel and each of the two wheel arms being firmly connected, in the region of the lower structural level, to the vehicle frame to extend backwards from the vehicle frame along a longitudinal direction of the industrial truck.

9. The autonomously-guided industrial truck of claim 1, wherein the at least two scanner units have one or more of a scanning angle of two hundred seventy degrees (270°) or a scanning field range, in the vertical direction, of fifty millimeters (50 mm).

10. The autonomously-guided industrial truck of claim 1, further comprising a load unit guided in a vertically-displaceable manner on the vehicle frame, for bearing a load.

11. The autonomously-guided industrial truck of claim 10, wherein the load unit has two fork prongs and a load stop connecting the fork prongs,
    wherein the load stop comprises two recesses opposite one another in a width direction, and
    wherein the two recesses are aligned, in a maximally-lowered state of the load unit, with the middle structural level.

12. The autonomously-guided industrial truck of claim 10, further comprising lifting profiles for guiding the load unit, the lifting profiles extending in the vertical direction only in a region of the upper structural level.

13. The autonomously-guided industrial truck of claim 10, wherein the load unit has a monofork with a load stop,
    wherein the load stop comprises two recesses opposite one another in a width direction of the autonomously-guided industrial truck, and
    wherein the two recesses are aligned, in a maximally-lowered state of the load unit, with the middle structural level.

14. The autonomously-guided industrial truck of claim 1, wherein the frame structure of the middle structural level lies completely within and at a distance from the vehicle contour with respect to a width direction of the autonomously-guided industrial truck.

15. The autonomously-guided industrial truck of claim 1, wherein the frame structure of the middle structural level has a tapered shape in a front section of the vehicle frame, and wherein the frame structure of the middle structural level comprises at least two connecting struts extending in a longitudinal direction of the autonomously-guided industrial truck between a the tapered shape of the front section and a rear section of the vehicle frame only in the upper structural level and not in the middle structural level.

16. The autonomously-guided industrial truck of claim 15, wherein two of the connecting struts delimit the frame structure of the middle structural layer in a width direction of the autonomously-guided industrial truck.

17. The autonomously-guided industrial truck of claim 1, further comprising an extension of eight hundred millimeters (800 mm) or less in width direction of the autonomously-guided industrial truck.

18. The autonomously-guided industrial truck of claim 1, wherein in the vertical direction:
    the lower structural level extends up to a height of seventy five millimeters (75 mm) above the driving surface;
    the middle structural level extends from a height of seventy five millimeters (75 mm) up to a height of one hundred twenty five millimeters (125 mm); and
    the upper structural level extends from a height of one hundred twenty five millimeters (125 mm).

19. The autonomously-guided industrial truck of claim 1, wherein the two scanner units comprise a pair of scanner units opposite one another in a width direction of the autonomously-guided industrial truck.

20. The autonomously-guided industrial truck of claim 1, wherein the base plate comprises an opening for receiving a single, controlled drive wheel.

21. The autonomously-guided industrial truck of claim 1, wherein the frame structure of the middle structural level surrounds an opening of the base plate.

22. The autonomously-guided industrial truck of claim 1, wherein the frame structure of the middle structural level has a tapered shape in a front section with respect to a longitudinal direction of the industrial truck.

23. The autonomously-guided industrial truck of claim 1, wherein the frame structure of the middle structural level delimits a scanning region of at least one of the at two scanner units.

* * * * *